(12) United States Patent
Halminen (10) Patent No.: US 6,477,378 B1
(45) Date of Patent: Nov. 5, 2002

(54) METHOD AND APPARATUS TO LIMIT FREQUENCY BANDS USED BY A LOW POWER RADIO FREQUENCY DEVICE

(75) Inventor: Harri Halminen, Kangasala (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/420,384

(22) Filed: Oct. 19, 1999

(51) Int. Cl.[7] ................................ H04Q 7/20
(52) U.S. Cl. .................... 455/450; 455/454; 455/62; 455/188.1
(58) Field of Search ............... 455/448, 454, 455/185.1, 186.1, 62, 188.1, 450, 71, 41, 69, 70, 517; 370/431; 375/222

(56) References Cited

U.S. PATENT DOCUMENTS 5,905,955 A * 5/1999 Bamburak et al. .......... 455/434
6,195,531 B1 * 2/2001 Aguirre et al. ............. 379/338

FOREIGN PATENT DOCUMENTS

| EP | 0709983 | 5/1996 |
| WO | 9501020 | 1/1995 |
| WO | 9948312 | 9/1999 |

OTHER PUBLICATIONS

"Digital Cellular Telecommunications System (Phase 2); Mobile Radio Interface Layer 3 ETSI Specification (GSM 04.08 version 4.22.0" Excerpt of GSM Global System For Mobile Communications of European Telecommunication Standard (Draft prETS 300 557), issued by European Telecommunications Standards Institute, Sophia Antipolis Cedex, France, May 1998, 11th Edition, pp 183–193.

"Specification of the Bluetooth TM System" (Low Power Radio Frequency [LPRF] Communication), at http:/www-.bluetooth.com on Internet, Excerpt by Telefonaktiebolaget LM Ericsson, Jul. 27, 1999, 6 pages.

* cited by examiner

Primary Examiner—Lester G. Kincaid
Assistant Examiner—Ronald J. Ward
(74) Attorney, Agent, or Firm—Ware, Fressola, Van Der Sluys & Adolpson LLP

(57) ABSTRACT

A method and corresponding apparatus for use by a low power radio frequency (LPRF) device intended to communicate with other LPRF devices on an LPRF band when both the LPRF band location and its width can vary by country, the invention for determining in what country the LPRF device is being used, and so the band and bandwidth that should be used, and for ensuring that the LPRF does not communicate on an LPRF band that is not likely the correct band, or is not a band indicated by a user. The invention assesses clues to determine if any particular country is reasonably likely to be the country where the device is being used, and if no such country is determined, and if a user interface is available, the device queries a user.

16 Claims, 5 Drawing Sheets

METHOD AND APPARATUS TO LIMIT FREQUENCY BANDS USED BY A LOW POWER RADIO FREQUENCY DEVICE

FIELD OF THE INVENTION

The present invention pertains to the field of telecommunications, including the field of mobile phone technology. More particularly, the present invention pertains to low power radio frequency communication used for short-distance communication.

BACKGROUND OF THE INVENTION

Recently, developments in technology have made possible the use of communication devices provided on small electronic chips that can be installed in host devices (such as a personal computer, headset, printer, modem, cellular telephone, or personal digital assistant), allowing the host devices to communicate with each other over short distances, typically from 10cm to 100m, thus making possible wireless communication between the host devices. Such communication is called low power radio frequency (LPRF) communication. One version of this technology is as specified in "Specification of the Bluetooth™ System," available at http://www.bluetooth.com on the Internet. "Bluetooth" is a technology trademark owned by Telefonaktiebolaget LM Ericsson.

Bluetooth™ operates in the unlicensed Industry-Scientific-Medicine (ISM) radio frequency (RF) band at 2.4GHz. A frequency hop transceiver is applied to combat interference and fading. A shaped, binary FM modulation is applied to minimize transceiver complexity. The symbol rate is 1 Ms/s. A slotted channel is applied with a nominal slot length of 625 ms. For full duplex transmission, a Time-Division Duplex (TDD) scheme is used. On the channel, information is exchanged through packets. Each packet is transmitted at a different hop frequency, i.e. on a different RF channel. A packet nominally covers a single slot, but can be extended to cover up to five slots.

The Bluetooth™ protocol uses a combination of circuit and packet switching. Slots can be reserved for synchronous packets. Bluetooth™ can support an asynchronous data channel, up to three simultaneous synchronous voice channels, or a channel which simultaneously supports asynchronous data and synchronous voice. Each voice channel supports a 64 kb/s synchronous (voice) channel in each direction. The asynchronous channel can support maximal 721 kb/s asymmetric (and still up to 57.6 kb/s in the return direction), or 432.6 kb/s symmetric.

Figure 1:
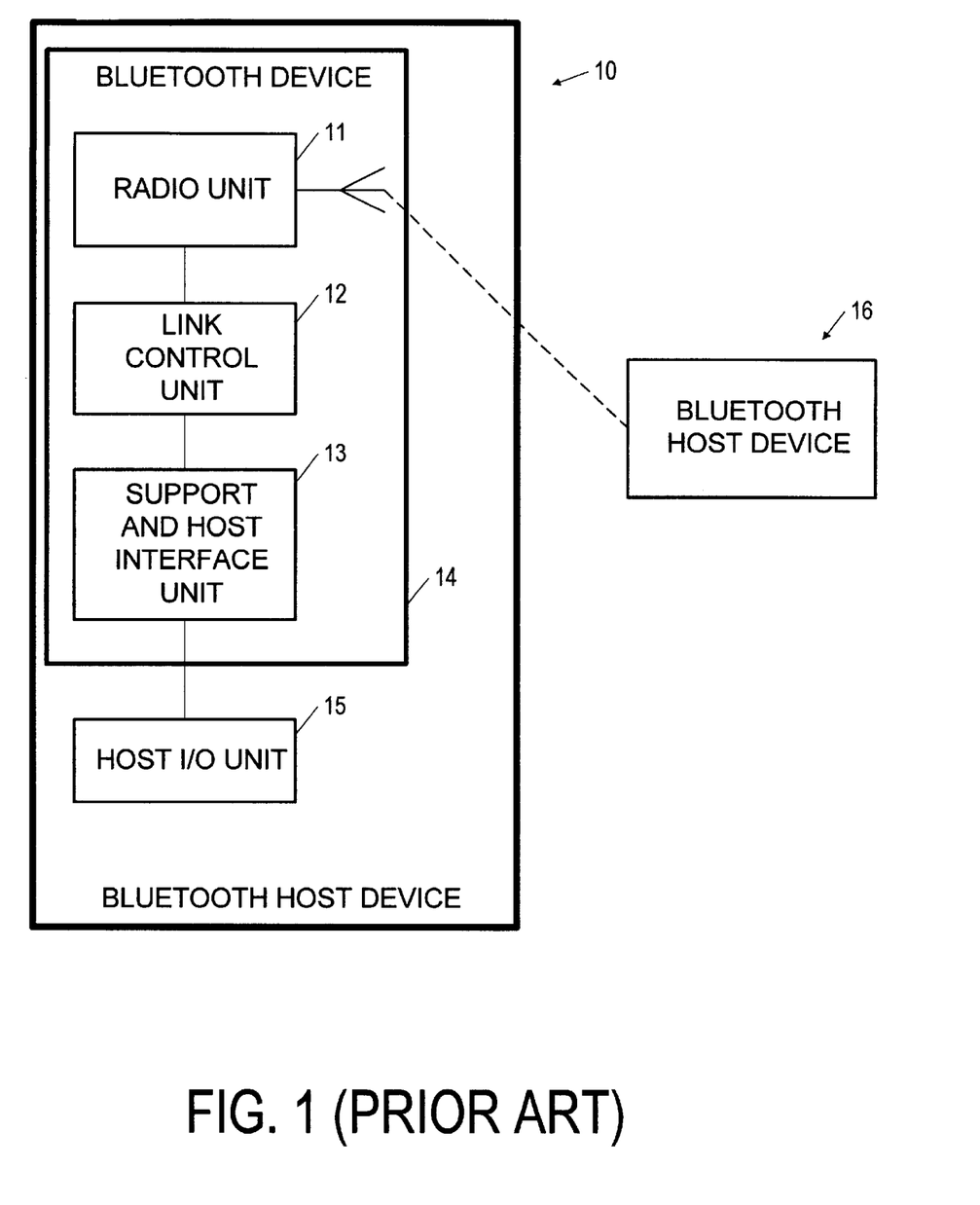
FIG. 1 is a block diagram of a Bluetooth™ device embedded in a Bluetooth™ host device, communicating with another Bluetooth™ host device.

Referring to FIG. 1, a Bluetooth™ device 14 is shown embedded in a host Bluetooth™ device 10 communicating with another Bluetooth™ host device 16. The Bluetooth™ device 14 consists of a radio unit 11, a link control unit 12, and a support and host interface unit for link management and host interface functions with a host I/O device 15. The Bluetooth™ link control unit 12 carries out the baseband protocols and other low-level link routines. Link layer messages for link set-up and control are defined in a Link Manager Protocol.

Figure 2:
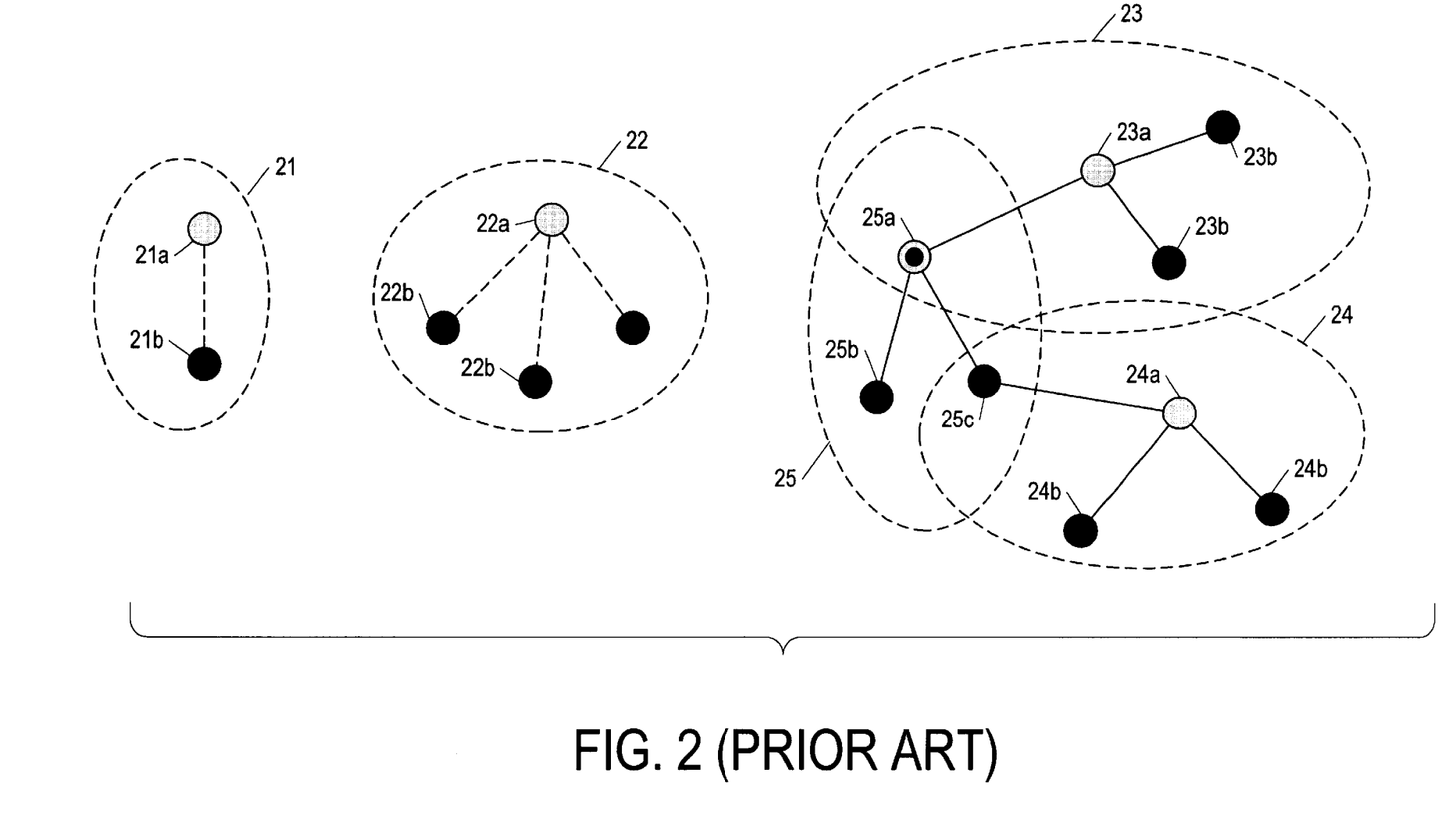
FIG. 2 is a schematic illustration of different possible piconet topologies.

The Bluetooth™ system provides a point-to-point connection (only two Bluetooth™ units involved), or a point-to-multipoint connection. In the point-to-multipoint connection, a channel is shared among several Bluetooth™ units. Two or more units sharing a channel form a piconet. One Bluetooth™ unit, the unit initiating a communication, acts as master of the piconet formed by the sharing of a channel, whereas the other units act as slaves. Up to seven slaves can be active in the piconet. Referring now to FIG. 2, piconets 21–25 are shown, each consisting of a master 21a–25a and one or more slaves 21b–25b and 25c.

In addition to the up to seven slaves that can be active in a piconet, many more slaves can remain locked to the piconet master in a so-called parked state. These parked slaves cannot be active on the channel, but remain synchronized to the master. Both for active and parked slaves, the channel access is controlled by the master. Multiple piconets with overlapping coverage areas form a scatternet.

Still referring to FIG. 2, each piconet 21–25 can only have a single master 21a–25a. However, slaves 25c can participate in different piconets on a time-division multiplex basis. In addition, a master 25a in one piconet 25 can be a slave in another piconet 23. The piconets are neither time nor frequency synchronized. Each piconet has its own hopping channel.

Although the 2.4 GHz ISM is globally available, the exact location within the ISM band where Bluetooth™ operates may differ by country. In addition, the width of the Bluetooth™ band may vary by country. In the U.S. and Europe, a bandwidth of 83.5 MHz is available; in this band, 79 RF channels spaced 1 MHz apart are defined. In Japan, Spain, and France, a smaller band is available; in this band, 23 RF channels spaced 1 MHz apart are defined.

As indicated above, a logical channel is a pseudo-random (frequency) hopping sequence of slots, hopping through the 79 or 23 physical RF channels. The hopping sequence is unique for a piconet and is determined by the LPRF device address of the master; the phase in the hopping sequence is determined by the LPRF clock of the master. The channel is divided into time slots where each slot corresponds to an RF hop frequency. Consecutive hops correspond to different RF hop frequencies. The nominal hop rate is 1600 hops/s for a Bluetooth™ unit. All LPRF units participating in a piconet are time and hop synchronized to the channel on which they are communicating.

Because all countries today do not dedicate the same RF band for Bluetooth™ communication (or LPRF communication generally), and because the RF band dedicated in some countries is used by the military or government in some other countries, there is a need for a protocol by which a Bluetooth™ device, or other, similar LPRF device, can determine which of the different dedicated RF bands to use. In order to do this, since which band to use is known once it is learned in which country the Bluetooth™ device or similar device is operating, what is needed is a protocol by which a Bluetooth™ device, or an LPRF device generally, can ascertain in what country it is located.

SUMMARY OF THE INVENTION

A method, to be performed by a low power radio frequency (LPRF) device, and corresponding apparatus, for determining in what radio frequency (RF) band to communicate, if at all, with another LPRF device, the LPRF band to be determined based on the country where the LPRF device is being used by resorting to information indicating the location and width of the LPRF band for a plurality of countries, the method comprising the steps of, and the apparatus including corresponding means for: acquiring clues from at least one source from among different kinds of sources and from among at least one of different individual sources of each particular kind, the clues consisting of at least one country code indicating one particular country; applying a likely determination algorithm to attempt to determine a likely country based on the clues acquired and a predetermined threshold; attempting to establish a link with the other LPRF device by providing a link setup signal, in a globally available LPRF service band, including, as a self-signaled country code, the likely country code, and receiving from the other LPRF device a corresponding link setup signal; deciding whether the country code signaled by the other LPRF device corresponds to the same RF band as does the self-signaled country code, and so deciding whether there is an agreed-on country code, and if so providing a signal indicating that the link setup is to be completed for communication on the band corresponding to the agreed-on country code, or else repeating the method starting from the acquiring clues step, or, in the apparatus, for signaling the means for acquiring clues to again acquire clues.

In a further aspect of the invention, the different kinds of sources include: the LPRF device itself, which has a country code embedded in it; a cellular signal that provides a country as part of a system information frame, such as GSM; and further, nearby LPRF devices, which periodically transmit a country code on a globally available LPRF service band.

In a still further aspect of the invention, the likely country code is determined based on summing weights associated with each indicated country code, the weights predetermined based on the kind of clue.

In yet a still further aspect of the invention, if a likely country is not determined by applying the likely determination algorithm, querying a user for a country code, and in establishing a link with the other LPRF device, instead of using a likely country code, using the user-provided country code.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

In the preferred embodiment, the present invention is a method that determines what is reasonably likely to be the country a Bluetooth™ device, or more generally any low power radio frequency (LPRF) communication device, is being used, or what a user says is the country, so as to determine the radio frequency (RF) band the LPRF device is to use for low power RF communication, and that ensures that the LPRF device will select a channel so as to communicate only in a band determined to be reasonably likely or provided by a user. In this description, the invention is described as it is implemented in a Bluetooth™ device in particular; but it is to be understood that the principles of the present invention apply equally well to any LPRF device operating in an RF band that can differ in different countries in either location in the spectrum or in width.

Thus, besides the preferred embodiment as a method for channel selection in Bluetooth communication, the invention has application to any system using relatively low power radio frequency for communication among its constituent devices. For example, the present invention could be used for channel selection in a wireless local area network or in a third generation cellular telephone system.

In the preferred embodiment of the present invention a Bluetooth™ device is manufactured with a particular country code embedded in the device, preferably in the link control unit 12 (FIG. 1). Preferably also, a user can change the country code embedded in the device. It is the embedded country code that is used, in the present invention, as a default (guess) for the country where the Bluetooth™ device is being used.

In the preferred embodiment a Bluetooth device is manufactured with the location and width of the bands to be used for LPRF communication in each of several countries. Thus, if the Bluetooth device can ascertain the country in which it is to be operated, according to the method of the present invention, it can resort to the embedded LPRF band/country information to determine the location and width of the band it is to use. Preferably, the LPRF band/country information can be updated by a user of the device, as necessary, because of traveling for example, or because of a change in the LPRF band/country information for a particular country.

Figure 3:
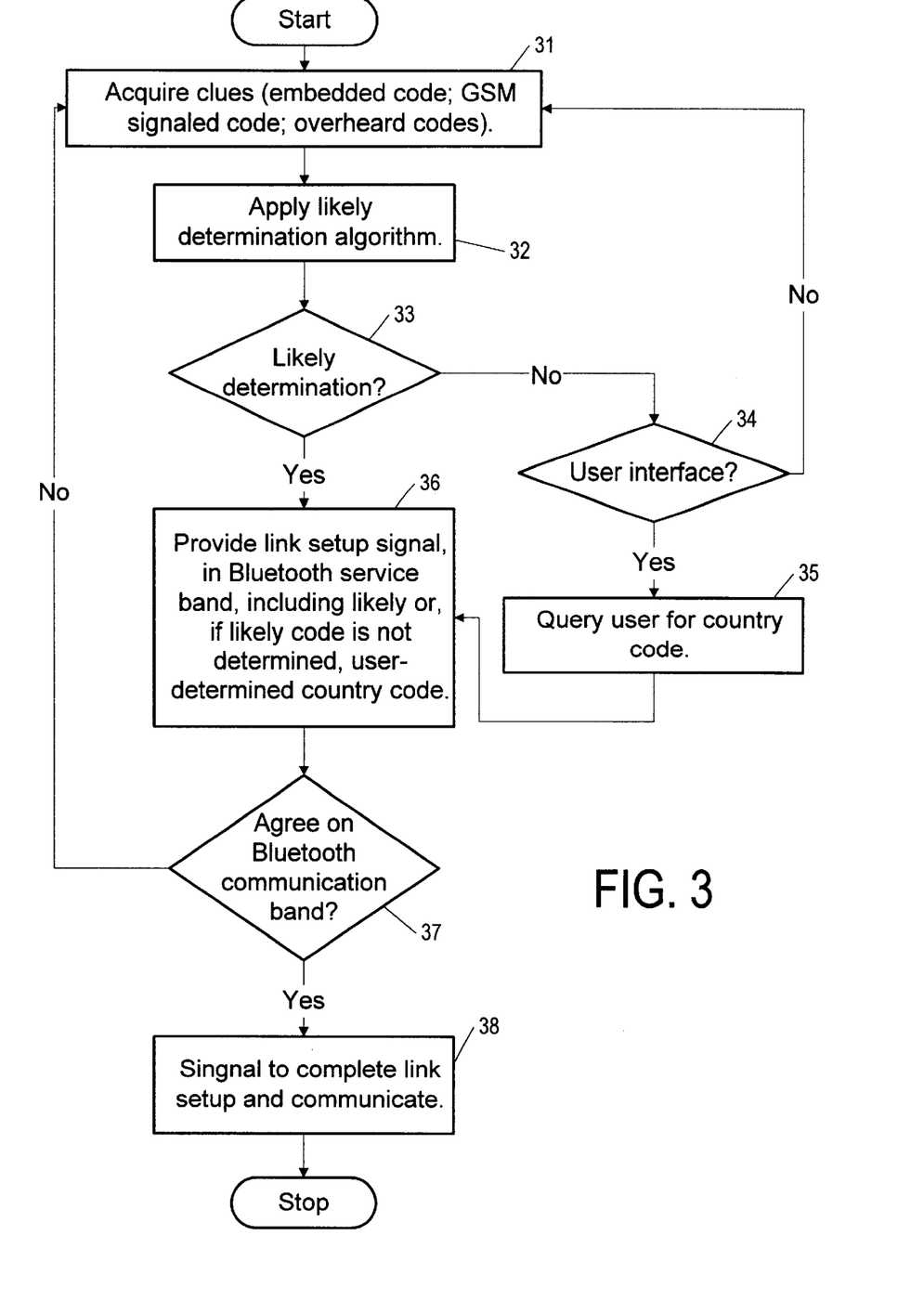
FIG. 3 is a flowchart showing the method of the present invention, by which a country code is determined as reasonably likely or is acquired by prompting a user.

Referring now to FIG. 3, after steps 31–35 (described below) for determining what country code to assume for operation, a step 36 is performed in which, in setting up a communication link between two Bluetooth™ devices, each device provides a link setup signal in a Bluetooth™ service band, allowed globally, that communicates a country code, and so indicates the location of the Bluetooth™ band that the device will use, and each device receives the link setup signal transmitted by the other device. If the two devices indicate different Bluetooth™ bands (as opposed to Bluetooth™ service bands, globally available), by communicating codes for countries where the location of the Bluetooth™ band differs, then each of the devices will seek to confirm its country code by repeating steps 31–35 leading to a determination of what country code to signal.

If the incompatible country codes are confirmed, i.e. if repeated determinations by each Bluetooth™ device lead to the same incompatible country codes (by repeating the steps 31–36, described below), then the devices will not communicate, as indicated in a decision step 37. Only if the two devices agree on compatible country codes (i.e. possibly different countries having the same location and width of the Bluetooth™ band) is there communication, as provided in a step 38, which also includes providing a signal to indicate that link setup can be completed to allow for communication in the band corresponding to the agreed-on country code. The underlying process corresponding to the decision step 37, for deciding whether the two devices agree on a Bluetooth™ band (both location and width), uses a table providing a band description (see FIG. 5) relating country codes to Bluetooth™ band assignments.

Still referring to FIG. 3, as indicated above, the step 36 in which a code is signaled by a Bluetooth™ device, as part of the link setup signal transmitted on the Bluetooth™ service band, relies on earlier executed steps 31–35 to provide a country code to signal. First, in steps 31–33, clues are evaluated to determine whether there is a basis for deciding whether any particular country code is reasonably likely to be correct. If not, then if the device has a user interface, including voice recognition, as determined in a decision step 34, an attempt is made, in a step 35, to acquire a country code from a user.

The underlying processes for the steps 34–35 by which whether a user interface is determined to be available and by which a user interface is made use of to query a user, are not the subject of the present invention. Preferably, however, a Bluetooth™ device would have a suitable user interface as part of its support and host interface unit 13 (FIG. 1). Alternatively, the support and host interface unit 13 of a Bluetooth™ device 14 in a Bluetooth™ host device 10 would be implemented to make use of a user interface already provided by the Bluetooth™ host device 10, or to make use of a user interface provided by the Bluetooth™ host device 16 with which the Bluetooth™ device 14 communicates.

Referring again to FIG. 3, the steps 31–33, by which an attempt is made to determine a reasonably likely country code, begin with the step 31 in which clues (indications) of the correct country code are acquired from up to three kinds of sources: a memory (not shown), embedded in the Bluetooth™ device, storing a country code; a cellular signal, such as a GSM signal, including a system information frame that provides a country code (a source which can be used only if the Bluetooth™ host device includes GSM functionality that is being exercised and is detected in a predetermined GSM listening interval); and other, nearby Bluetooth™ devices, which periodically broadcast a country code and identifier on the Bluetooth™ service band, and which can then sometimes be overheard (detected) by the Bluetooth™ device listening for a predetermined LPRF listening interval.

In the next step 32, the method of the present invention uses an algorithm for arriving at a reasonably likely determination.

Figure 4:
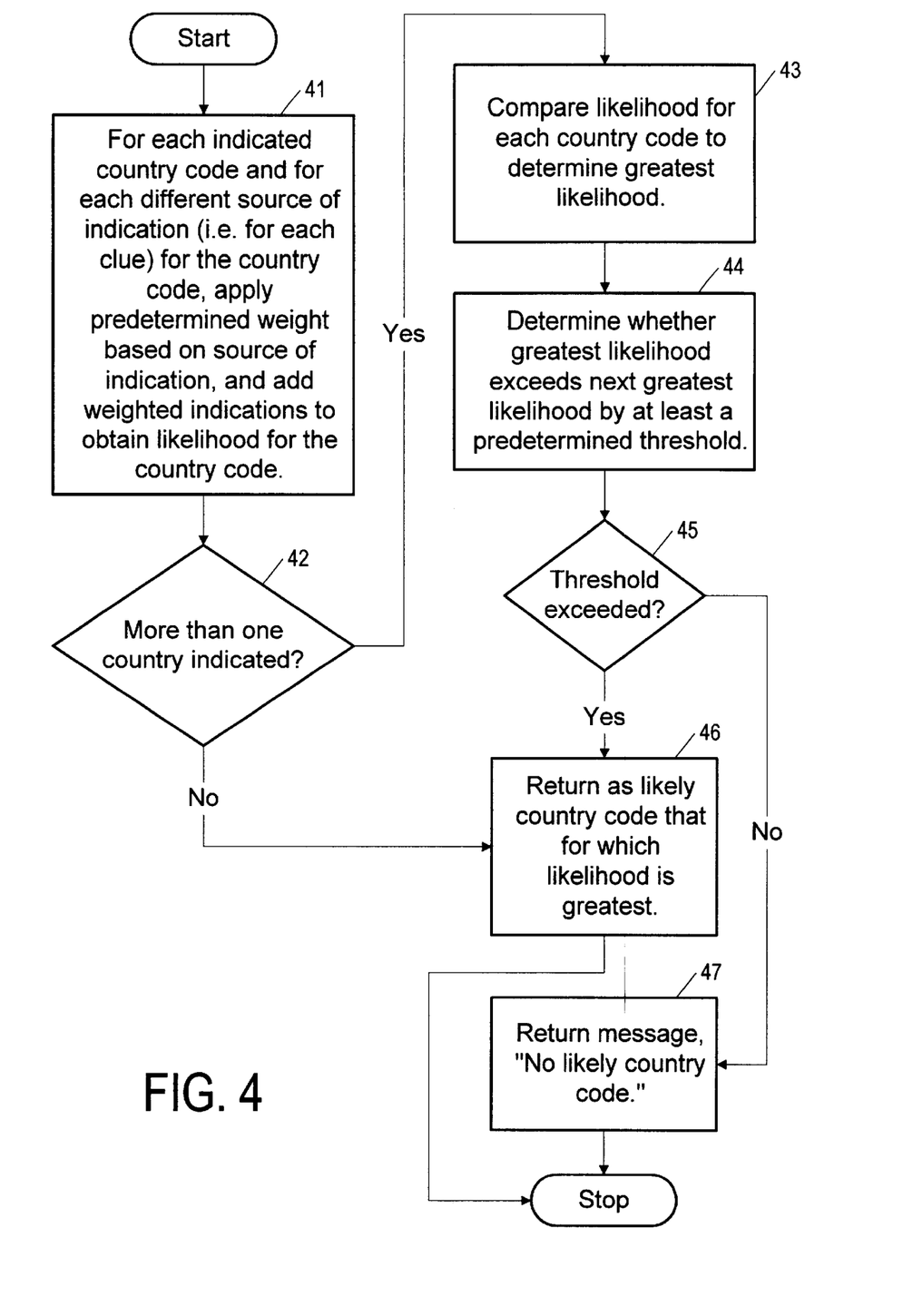
FIG. 4 is a flowchart showing an algorithm, according to the present invention, by which an attempt is made at determining a reasonably likely country code.

Referring now to FIG. 4, the algorithm is shown as beginning with a step 41 in which predetermined weights are assigned to each different clue based on the kind of source. The clue from the embedded country code is assigned one predetermined weight; a clue extracted from a GSM signal, if one is detected, is assigned another predetermined weight; and each clue provided by each different, overheard Bluetooth™ device is assigned another predetermined weight. For this last weighting, according to the present invention, a Bluetooth™ device signals an identifier on the globally available Bluetooth™ service band, as well as a country code, thus making possible a distinction between the same country code signaled by different Bluetooth™ devices.

Thus, e.g., a weight of 1.0 can be assigned to the embedded country code, a weight of 0.5 to a country code extracted from a GSM signal or other cellular signal conveying a country code, and a weight of 0.4 for each overheard country code issuing from a different Bluetooth™ device. If a same code is overheard from four different Bluetooth™ devices, a total weight of 1.6 is attached to the clue that the country code is that transmitted by the four different Bluetooth™ devices.

Then, in the same step 41, the likelihood for each indicated country is determined by adding the weights for indications of each country.

Next, in a decision step 42, if only one country is indicated, the method branches to a step 46 in which the algorithm returns as its result the country code for the only indicated country (which is then also the country code for which the likelihood is greatest). If, however, more than one country is indicated, the algorithm, in a step 43, compares the likelihood for each indicated country to determine which country code has the greatest likelihood. Then in a next step 44, the algorithm determines whether the greatest likelihood exceeds the next nearest likelihood by more than a predetermined threshold. Then, in a next, decision step 45, if the threshold is exceeded, the algorithm performs the step 46 in which it returns as its result the country code for which the likelihood is greatest. If, however, the threshold is not exceeded, or in other words, if the clues provide only a close call and not a more clear indication, the algorithm performs a step 47 in which it returns a message indicating that a likely country code could not be determined from the clues.

Referring back to FIG. 3, in a decision step 33, if a likely determination is made by the algorithm, the reasonably likely country code is used in the link setup signal in the next step 36. If not, then an attempt is made in steps 34–35 to query a user, as explained above.

Figure 5:
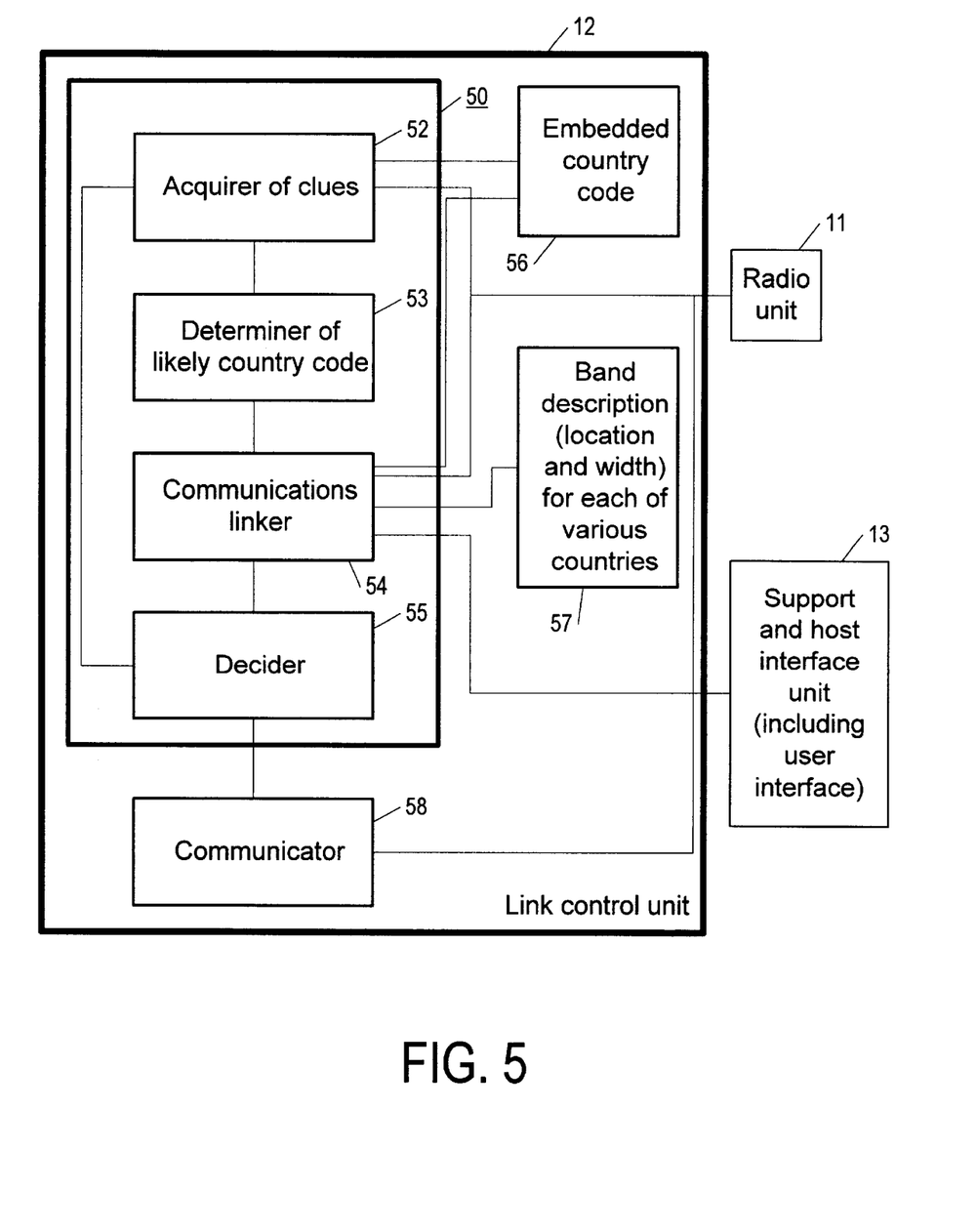
FIG. 5 is a block diagram of an apparatus according to the present invention.

Referring now to FIG. 5, in the preferred embodiment, an apparatus 50 according to the preferred embodiment is part of a link control unit 12 in a Bluetooth™ LPRF device 14 (see also FIG. 1). The apparatus 50 is shown as including an acquirer of clues for acquiring clues as to what country the LPRF device is being used, from at least one source from among different kinds of sources and from among at least one of different individual sources of each particular kind. The clues acquired consist of at least one country code indicating one particular country, the at least one country code being the embedded country code 56.

The apparatus 50 also includes a determiner 53 of a likely country code. The determiner module 53 makes use of the likely determination algorithm described above, an algorithm that attempts to determine a likely country based on the clues acquired and based on a predetermined threshold, as explained above.

Next, the apparatus includes a communications linker 54 for attempting to establish a link with another LPRF device by providing a link setup signal in a globally available LPRF service band. The link setup signal includes, as a self-signaled country code, the likely country code determined by the determiner module 53, if the determiner module provides a likely country code. If not, the communications linker makes use of whatever user interface is available as part of the support and host interface unit 13 to query the user for a country code. In the preferred embodiment, the communications linker 54 will offer, as a service to the user, to overwrite the embedded country code 56 with the user-supplied country code. The communications linker 54 receives from the other LPRF device a corresponding link setup signal and extracts from the link setup signal a country code signaled by the other LPRF device.

In addition, the apparatus 50 includes a decider module 55 for deciding whether the country code signaled by the other LPRF device corresponds to the same RF band as does the self-signaled country code. If it does, then the decider signals to a communicator module 58 to complete the link setup, including determining a particular channel, and to proceed communicating with the other LPRF device on the channel in the LPRF band corresponding to the agreed-on country code. If the country code signaled by the other LPRF device does not correspond to the same RF band as does the self-signaled country code, or else signaling the means for acquiring clues to acquire clues again.

It is to be understood that the above-described arrangements are only illustrative of the application of the principles of the present invention. In particular, besides LPRF applications, the present invention can be used for channel selection in wireless local area network devices, and in third generation cellular telephone systems, both of which make use of relatively low power radio frequency communication and include devices for selecting channels in the spectrum assigned for their use. Indeed, the language low power radio frequency device is intended to comprehend all such devices, not merely devices operating according to the Bluetooth™ specification. Numerous modifications and alternative arrangements may be devised by those skilled in the art without departing from the spirit and scope of the present invention, and the appended claims are intended to cover such modifications and arrangements.

What is claimed is:

1. A method, to be performed by a low power radio frequency (LPRF) device, for determining in what radio frequency (RF) band to communicate, if at all, with another LPRF device, the LPRF band to be determined based on the country where the LPRF device is being used by resorting to information indicating the location and width of the LPRF band for a plurality of countries, the method comprising the steps of:
    a) acquiring clues from at least one source from among different kinds of sources and from among at least one of different individual sources of each particular kind, the clues consisting of at least one country code indicating one particular country;
    b) applying a likely determination algorithm to attempt to determine a likely country based on the clues acquired and a predetermined threshold;
    c) attempting to establish a link with the other LPRF device by providing a link setup signal, in a globally available LPRF service band, including, as a self-signaled country code, the likely country code, and receiving from the other LPRF device a corresponding link setup signal;
    d) deciding whether the country code signaled by the other LPRF device corresponds to the same RF band as does the self-signaled country code, and so deciding whether there is an agreed-on country code, and if so providing a signal indicating that the link setup is to be completed for communication on the band corresponding to the agreed-on country code, or else repeating the method starting from the acquiring clues step.

2. The method of claim 1, wherein the different kinds of sources include: the LPRF device itself, which has a country code embedded in it; a cellular signal that provides a country as part of a system information frame; and further, nearby LPRF devices, which periodically transmit a country code on a globally available LPRF service band.

3. The method of claim 2, wherein the country code embedded in the LPRF device can be changed by a user.

4. The method of claim 2, wherein the likely country code is determined based on summing weights associated with each indicated country code, the weights predetermined based on the kind of clue.

5. The method of claim 4, wherein if the likely determination algorithm produces no country with a likelihood that exceeds the pre-determined threshold, querying a user for a country code, and, in establishing a link with the other LPRF device, instead of using a likely country code, using the user-provided country code.

6. The method of claim 5, wherein the LPRF device operates according to the Bluetooth protocol.

7. The method of claim 5, wherein the LPRF device is a device used in a wireless local area network.

8. The method of claim 5, wherein the LPRF device is a device embedded in a third generation cellular telephone.

9. apparatus for use in a low power radio frequency (LPRF) device, for determining in what radio frequency (RF) band to communicate, if at all, with another LPRF device, the LPRF band to be determined based on the country where the LPRF device is being used by resorting to information indicating the location and width of the LPRF band for a plurality of countries, the apparatus comprising:
    a) acquiring means for acquiring clues from at least one source from among different kinds of sources and from among at least one of different individual sources of each particular kind, the clues consisting of at least one country code indicating one particular country, the acquiring means responsive to a signal to acquire clues, for providing the clues acquired;
    b) determination means for applying a likely determination algorithm to attempt to determine a likely country based on the clues acquired and a predetermined threshold, the determination means responsive to the clues and to the predetermined threshold, for providing a result that indicates the likely country;
    c) linking means for attempting to establish a link with the other LPRF device by providing a link setup signal, in a globally available LPRF service band, including, as a self-signaled country code, the likely country code, and receiving from the other LPRF device a corresponding link setup signal and extracting from the link setup signal a country code signaled by the other LPRF device, the linking means responsive to the result that indicates the likely country, the linking means for providing the country code signaled by the other LPRF device;
    d) deciding means for deciding whether the country code signaled by the other LPRF device corresponds to the same RF band as does the self-signaled country code, and so deciding whether there is an agreed-on country code, and if so providing a signal indicating that the link setup is to be completed for communication on the band corresponding to the agreed-on country code, or else signaling the acquirer means to acquire clues again.

10. The apparatus of claim 9, wherein the different kinds of sources include: the LPRF device itself, which has a country code embedded in it; a cellular signal that provides a country as part of a system information frame; and further, nearby LPRF devices, which periodically transmit a country code on a globally available LPRF service band.

11. The apparatus of claim 10, wherein the country code embedded in the LPRF device can be changed by a user.

12. The apparatus of claim 10, wherein the likely country code is determined based on summing weights associated with each indicated country code, the weights predetermined based on the kind of clue.

13. The apparatus of claim 12, further comprising a querying means for querying a user for a country code if the likely determination algorithm produces no country with a likelihood that exceeds the pre-determined threshold, and wherein the linking means, in establishing a link with the other LPRF device, instead of using a likely country code, using the user-provided country code.

14. The apparatus of claim 13, wherein the LPRF device operates according to the Bluetooth protocol.

15. The apparatus of claim 13, wherein the LPRF device is a device used in a wireless local area network.

16. The apparatus of claim 13, wherein the LPRF device is a device embedded in a third generation cellular telephone.

* * * * *